Sept. 2, 1952     C. J. BOTTEMANNE     2,608,782
TRAWLNET
Filed July 6, 1949
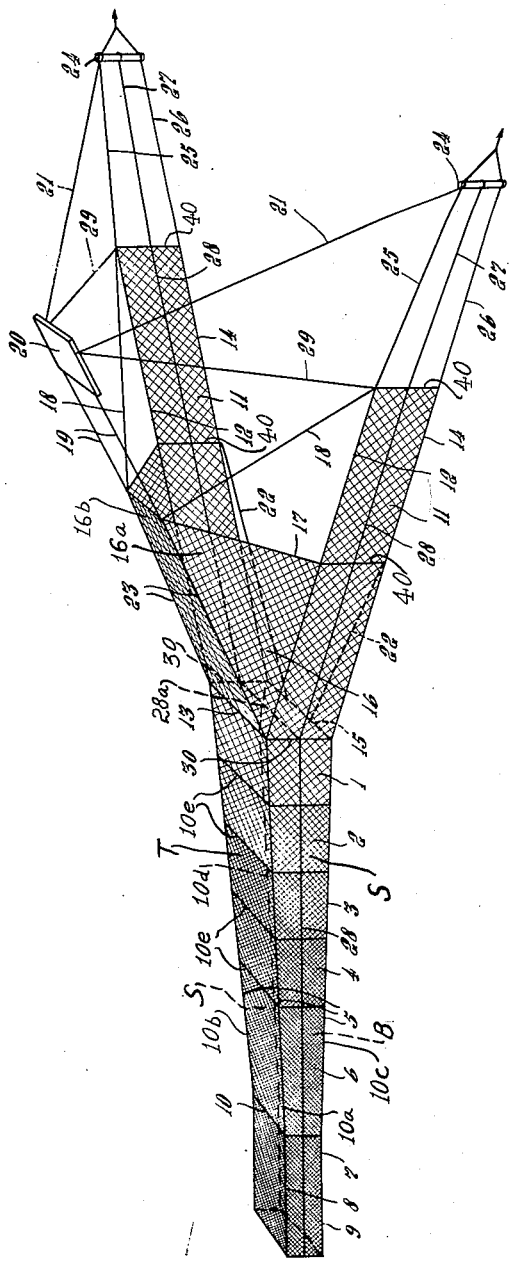
INVENTOR.
CASPER JOSEPHUS BOTTEMANNE
BY Toulmin & Toulmin
ATTORNEYS Patented Sept. 2, 1952

2,608,782

UNITED STATES PATENT OFFICE 2,608,782

TRAWLNET

Casper Josephus Bottemanne, Voorburg, Netherlands, assignor to Dorus van Pel, Soerabaya, Indonesia Application July 6, 1949, Serial No. 103,222
In the Netherlands July 20, 1948

6 Claims. (Cl. 43—9)

This invention relates to nets employed for catching fish and particularly to trawl-nets.

The principal criterion to go by in judging of the value of a net is the size of the catch obtainable with it. At a given output of the ship's engines, a given density of fish and a given trawling speed the size of the catch that may be obtained with trawl-nets mainly depends on the size of the mouth opening of the net. The size of the mouth opening is a resultant of the shape and the construction of the net. Moreover the construction of the net dermines the carrying capacity thereof.

A great many drawbacks are inherent in conventional trawl-nets. In the course of years the height of the upper rope above the bottom of the sea has undoubtedly increased in an absolute sense but in proportion to the length of the ground ropes it has increased comparatively little. This increase is most pronounced in the herring trawl, the back or square portion of which has undergone the greatest lengthening.

At the same time, the herring trawl cannot be regarded, even in its latest form, as a net having a high vertical opening.

Furthermore trawl-nets will often tear in certain places. This is indicative of structural defects and often occurs in the case of large catches or high resistances when the trawl-nets will tear off along the ropes. Besides the shape of the net is practically wholly dependent on the structure of the various parts of the net and on the manner in which these parts are joined. Trawl-nets, namely, comprise hardly any reinforcements. Only the heavy upper and lower ropes function as such, but to a limited extent, the net proper being mainly kept open by the flow of water.

The increase of the vertical mouth opening has principally arisen from the gradual enlargement of the rear portion of the net combined with the application of the sheering board. In consequence both the vertical and the horizontal spread has become dependent on the position of the upper rope. The conventional construction, moreover, causes strains, especially on the belly side and adjacent the extremities of the ground rope middling, while in addition it limits the size of the net to certain maximum measures.

The above circumstances give rise to considerable losses in catches. A striking example is the herring trawl which cannot possibly be hauled in if it is entirely filled. In such a case part of the catch must, therefore, be allowed to escape. Furthermore the nets of the big trawlers are distinctly undersized relative to the capacity of the trawlers. The nature of the construction, however, prevents the nets from being further enlarged.

Consequently it is highly desirable for trawl-nets to have a better construction and at the same time a shape that is better suited to the purpose intended, if a further increase in the size of the catches obtainable with trawl-nets for any particular size trawler, particularly large trawlers, is to be achieved.

A net according to the present invention is illustrated in the drawing. According to the present invention, the trawl-net comprises two wings 11, each having an upper rope 12, and a lower rope 14 which equal each other in length and are arranged in parallel and superposed relation. At the rear ends of the wings there is connected between the upper ropes 12 a horizontal rope 13, hereinafter called "middling" and between lower ropes 14 is a corresponding middling 15. Both the middlings 13 and 15 extend transversely to the direction of trawling. The central portion of the net immediately behind middlings 13, 15, comprises at least four main lines or ropes, 10a, 10b, 10c, and 10d, extending from the points where the middlings connect with ropes 12 and 14 at the rear end of the wings 11 of the net back to the end of the cord 7. A back portion 16 is located between the upper sides of the wings before the entrance to the central portion, said back portion comprising at its leading edge a back rope 17, the length of which rope is greater than the distance between the wings measured in a horizontal direction between those points on the upper side of the wings where said back rope is connected to the wings. The back piece 16 is thus arched and has the triangular side parts 16a and a top part 16b.

In constructing the trawl-net according to the invention the following principles were kept in mind:

A. In the net, lines or ropes should be provided along which the forces will act substantially in longitudinal direction.

B. The construction of the net must bring about a high vertical net-opening and nets that are proportioned to large ships within the range of possibility.

C. The construction must render it possible in the simplest manner to attain the purpose for which the net is intended.

D. The construction must be wholly based on the use of trawl-nets in actual practice.

Conventional trawl-nets have their origin in the very low trail-nets for flat-fish and still exhibit some of the characteristics of such nets. One of the main characteristics is that the net is suspended from the upper and lower ropes. The old flat-fish net comprised an upper rope stretched between the ends of a beam, which upper rope, in conjunction with the lower rope secured to the lower end of the runners of the beam, trailed the central portion (or waistpiece) and the cod of the net via the back. As has already been observed, the trailing forces are still distributed over the netting via said ropes as are the hoisting forces during the hauling in of the net. Said ropes each change their direction from a longitudinal to a transverse one via a transitional rounding, which is not conducive to a proper transmission of the trailing forces from these ropes to the net.

In the construction according to the invention, the lines along which the forces act, may run either through ropes or through compacted or laced meshwork of the net in such a manner that a zone of strength is formed at the point where the forces will occur.

It is, of course, evident that the shape of the net should be determined beforehand. This shape is closely bound up with the function of the net and with any indications as to the most propitious solutions which actual practice gives in this respect. Furthermore said shape depends on the desiderata concerning the height and the size of the net as well as on the maximum load to which the net will be subjected. Moreover the shape must be adapted to the provision of a favorable distribution of the forces acting on the net.

The trawl-net according to the present invention comprises two wings, indicated at 11 in the drawing—that are kept open by otterboards or by two ships—to which wings the net proper is attached and which pass upright through the water, the walls of said wings are extended rearwardly to the forward end of the net. The wings spread out in the shape of a V and their forward tips are wide apart.

The greater the spread of the wings the greater—in principle—the catching capacity, up to a certain limit. The central portion of the net comprising parts 1, 2, 3 and 4, however, need not be V-shaped. To the contrary, it is preferable for this portion and for the cod 7 and the intermediate part 6 to have substantially parallel sides. This will reduce their resistance in the water, while confining the V-shape to the wings will also reduce the volume of the net and thus the resistance to trawling. At the point where the central portion of the net and the wings meet the vertical side walls of the net have to be drawn towards each other. According to the invention the lines or ropes 10a, 10c and 10d, through which the forces act are provided in the vertical walls. The transverse forces are taken up by transverse connections between the vertical walls, which transverse connections consist of the middlings 13, 15 of the upper rope 12 and the lower rope 14. To these transverse connecting lines the upper and the lower walls of the central portion of the net are secured.

In addition to properly taking up the forces during the fishing, the construction of this new net is also excellently suited for hauling in the catch.

Where the existing nets often tear during the hauling in operation, the possibility of this happening to the net according to this invention is practically precluded; the mouth of the central portion to the closed position, called "quarter ropes," have their points of application in the points of their connection of the lower ropes 14 and their middling 15 and are guided via the points of connection of the upper ropes 12 and its middling 13, or vice versa.

In connection with the above the mouth of the central portion of the net which is formed by the two (horizontal) middlings 13, 15 interconnected by the two vertical ropes 30 at their extremities, becomes completely rectangular. In the case of high nets, the side walls and, consequently, said vertical ropes between the middlings will slightly bulge, in which case the mouth of the central piece will nevertheless substantially retain its rectangular shape.

The central portion of the net according to the invention comprises two main parts viz. a front part comprising sections 1, 2, 3 and 4 consisting of truly rectangular pieces of netting and a rear part comprising section 6, in which latter part the convergency of the lines or ropes 10a, 10b, 10c and 10d is brought about by reducing the number of meshes i. e. the number of meshes transversely of the section is reduced toward the rear end thereof. The net consists, generally, of a top wall T, a bottom wall B, and side walls S, with the net generally tapering inwardly from front to rear. In the front part the convergency of the said lines or ropes is not achieved because of any reduction in the number of meshes in the rectangular pieces of netting, because the meshes of the successive sections of this front part link up with one another, but, because the meshes of the successive sections increase in number per unit of width and proportionately decrease in size towards the rear of the net. At each intersection between successive sections of the front part of the net and between section 4 and section 6 there is the rectangular rope structure 10e that supports and connects the sections. The convergency of the lines or ropes 10a, 10b, 10c, and 10d in the rear part of the central portion, including section 6, is so chosen that the whole central portion has the shape of an equilateral frustrum of a pyramid. Thus it becomes practically possible to arrange the lines or ropes in the entire central portion so that the lines of force run in an uninterrupted manner.

As in view of a correct transmission of forces the upper and the lower ropes 12 and 14 have to run parallel, and the wings of the net may consist of a number of rectangular pieces of netting connected between parallel reaches of the ropes.

The new net is comparable with a so-called skeleton building wherein the skeleton (in the net the ropes along which the lines of force act) takes up the forces and wherein the wall-plates (in the net, the meshwork) close the bays framed by the skeleton members.

Thus the net acquires the character of a building wherein the main structure is formed by a skeleton but wherein also the walls have a supporting function. Consequently, the netting in the framework formed by the ropes along which the lines of force run must also help to take up the total of forces acting on the net and besides it must keep the ropes along which the lines of force run in their proper relationship. The ropes along which the lines of force run and the netting must be integral with one another. At the same time the important function of this netting viz the enclosing of the catch, comes more to the fore now. This netting cannot be arranged in the skeleton referred to above in any manner. Every superfluous mesh gives an additional friction loss and at the same time a loss in the forces to be transmitted, while as a result the transmitted forces will act in the wrong points. To taut a netting will absorb too much of the forces to be transmitted and consequently the netting will run the risk of tearing. The dimensions of each section of netting should correspond, therefore, to the length of each of the "ribs" framing said section. It is now possible to specify these dimensions whereas in the existing nets they are arbitrary.

From the foregoing it follows that the so-called "back" of the net, 16, should be loosely arranged between the upper ropes 12 of the two wings and the upper middling 13. From the view point of catching fish, the function of this back is merely to prevent the fish from escaping in upward direction.

In the development of the conventional trawlnets, however, the back (or square) remained a vital part of the net so that in the existing nets it still plays a part in the transmission of forces. In the new construction, however, this part is eliminated because the upper rope 12 and its middling 13 is displaced farther to the rear up to a point directly over the lower rope 14 and its middling 15. The original double function of the old upper rope is now spread over the new upper rope and an auxiliary upper rope, which here is called "back rope" and which is indicated at 17 at the leading edge of back 16.

It would be possible to build up the skeleton of the net out of one or a few parts but it is simpler and more practical for the ropes or lines to be secured to one another at the points of junction by tying or shackling them together.

In order to enable the mouth of the central portion to be properly kept open, spaced points adjacent the middle part of the back rope 17 are connected with the adjacent of the upper ropes 12 or the lower ropes 14, by means of two lines 18 and are further connected with a sheering board by means of two more lines 19.

If only a back piece is used, it is recommendable for the middling of the lower rope of large nets to be connected with the wing-portions of said lower rope by two lines 22 which are secured to said lower rope in points located under the points where the back rope is secured to the upper rope.

Furthermore large nets may be provided with intermediate lines or ropes between the horizontal lines of cod, central portion, and wings, as well as with extra conventional quarter ropes which have their points of application located adjacent the mouth of the central portion at the points of junction of the said intermediate lines running in the side faces of the central portion. In the drawing the cod 7 is secured to the rear end of back part 6 by the rectangular rope structure 10 which corresponds to the rope structure 10c, previously described.

It is in the line of development of the idea underlying the invention that if it is desired to increase the weight of the lower rope conventional sinkers may be disposed in or adjacent the points of junction of the lines formed by the lower rope and the associated lower middling, below the points where the back rope is secured to the wings and at the ends of the wings.

In the drawing the central portion of the net consists of the sections 1 to 4 which are knit as true rectangular bodies. The sections are all of the same length, and the meshes of successive sections increase in number per unit of width and proportionally decrease in size towards the rear of the net, while the meshes of the sections link up with one another. As a result, at least the front part of the central portion is shaped like the frustrum of a pyramid.

A pyramidal configuration corresponding to that of the sections 1 to 4 is given to the rear part 6 by reducing the number of meshes transversely, i. e., by tapering the section. The sections of the central portion link up with one another and with the cod 7 with equal numbers of meshes.

The edges 5 of the pyramid are formed by lacings or, as by the ropes 10a, 10b, 10c, and 10d, which on the one hand merge into the lines or ropes 8 and 9 at the corner of the double knit cod 7 and which on the other hand merge into the upper and lower ropes 12 and 14 of the wings 11.

The wings 11 consist of pieces that are knit as true rectangular bodies. These pieces do not link up with each other with equal numbers of meshes.

Each piece is framed at the ends by thin vertical ropes, 40. In order to interconnect the pieces of each wing, the vertical ropes at adjacent ends of the said pieces are tied together.

The "lower rope" 14 is similar to the "upper rope" 12 and is formed by the ropes 14 connected by the lower middling 15. The middlings 13 and 15 are on either side connected by a vertical rope 30 to form a quadrangle. The ropes 40 extend between the upper ropes 12 and the lower ropes 14.

The upper rope lies straight above the lower rope and not obliquely above it, as is the case with the conventional nets. Between the wings and at the upper side thereof a back piece 16 is provided, along the front edge of which the back rope 17 is located. The triangular configuration—from front to back—of the side pieces 16a of the back is obtained by reducing the number of meshes. The middle part of the back rope is connected with the forward upper tips of the wings by lines 18, with the middling 13 by lines 23 and with the sheering board 20 by lines 19. From said sheering board, lines 21 run to the sticks 24. These lines 21 are identical with the headline of a conventional trawl.

The middling 15 has intermediate points thereof connected with the wings 11 by lines 22 which lines are secured to the wings in points lying under the points where the back rope 17 is secured to the wings.

The sticks 24 are connected with the tips of the wings by the lines 25 and 26. The line 27 runs to the intermediate lines or ropes 28 having the middling 28a therebetween at the mouth of the net. The lines 29 connecting the sheering board with the upper wing tips assists in keeping the wing tips up. Said wing tips are kept up primarily by the lines 25 and 18. The lines 23 and 19 pull the middling 13 up. The lines 25, 12, 10a, 10b and 8 and 26, 14, 10c, 10d and 9 respectively, therefore, form main lines or ropes extending to the end of the cod 7.

A net thus designed may be used for ground fishing as well as for fishing in the midwater zones. Owing to its well balanced structure it may also be used for pelagic fishing. None of the trawl-nets that have hitherto been employed were suited for that purpose, for the friction between the lower rope and the bottom of the sea forms an important factor in properly keeping said nets open. The lines or ropes applied in the net according to the invention eliminate this factor.

Moreover it is now possible—when using the net for pelagic fishing—to provide the belly side of the net with a so-called belly piece which has a shape and a system of lines corresponding to those of the back piece 16, by which belly piece the vertical opening of the net is considerably increased. Such a belly piece is like back 16 except it extends downwardly from the bottom of the mouth of the net instead of upwardly from the top of the mouth.

Owing to its construction, the net thus designed may be of larger dimensions vertically as it enables high vertical side walls to be used along with which a high back rope may be provided. As a result, the total mouth opening will be considerably higher than that of the conventional trawl-nets having a ground rope of about the same length.

In the conventional trawls, the upper rope is kept up by a headline to which a sheering board is connected. The upper rope—which is too short—is drawn upwardly by said board at the cost of the spread of the wings. The new net starts from an optimum spread of the wings. Between the upper rope and the middling, the back is inserted in such a manner that the position of the wings is hardly influenced by it, which is also achieved by determining the correct length of the lines 21. Furthermore the back rope 17 may show an upward curve that is much greater than the curve in the existing nets without affecting the rest of the net.

Moreover the back of the new net may be longer than the square of a conventional net. The characteristic feature of the new structure of the back therefore, resides in the fact that the back no longer plays a part of any importance in the transmission of forces to the other portions of the net.

The system of lines or ropes thus obtained and shown in the drawing is capable of keeping the net open to the optimum extent even without a flow of water if forces of the size normally encountered are exerted on the ends of the wings and on the sheering board, and if only at the end of the cod the influence of the flow of water is simulated by exerting an appropriate force in rearward direction. Each of said lines or ropes has a function in the whole net, which but for these lines would not stand open in the right way.

Since the main forces are taken up by the lines or ropes arranged according to the present invention, the netting in the foremost portions of the net may have larger meshes and besides may be relatively lighter in weight without impairing the strength of the net. The main function of the back and the wings is namely to drive the fish towards the mouth of the central portion. The fish are scared away by the netting and turn aside. Mostly, however, it is already too late to escape and consequently they will get into the central portion of the net. Larger meshes in the back and the wings will naturally considerably reduce the resistance of the net. The netting of the conventional trawl, however, must have smaller meshes because ropes along which the lines of forces may run in the manner of the present invention are lacking in these nets and substantially all of the load is imposed on the net portion.

Another special feature is that in the net of this invention the course of the conventional quarter ropes logically follows from the construction and lead along the ropes framing the net so that the forces of closing the net during hauling in a catch are not imposed on the net sections but are carried by the framing ropes.

The shape of the net further enables all the portions of the netting, except the back and the last section of the central portion, to be made up of panels of netting knit as true rectangles and in consequence may be knit mechanically. The departure of the panels from their true rectangular stage takes place when the sections are placed together and connected to the rope framework of the net. An additional advantage thereof is that all the wing sections and the sides of each section of the central portion are mutually interchangeable in pairs. Furthermore the entire net may be turned upside down if the lower side shows signs of wear, so that the upper side is used as lower side then.

The interchangeability of the parts of the net is even enhanced because the ropes may be secured to one another at the points of junction in a detachable manner, as by ordinary metal shackles, or are tied together, so that complete sections of the net may be detached and replaced in a very simple manner. This is also possible because the construction of the net enables the sections of netting to be interconnected in a simpler manner.

This does away with the time-consuming interchange of conventional trawl-net parts and at the same time facilitates the attachment of other parts of netting for use in fishing for a different species of fish e. g. herring.

In the specification the term "quarter-rope" refers to rope such as described in the publication "Introduction to Trawing," by A. Hodson, published 1948.

The net described is for use with part 16 above the mouth of the net with the sheering board 20 employed to retain part 16 arched. It will be evident, however, that the net could be inverted so the part 16 was below the mouth of the net and with the net so arranged either the sheering board 20 or a weight could be used to hold part 16 in an arched condition. What the sheering board 20 provides in either position of the net, and what the described weight would provide, is a thrust on the part 16 transverse to the direction of travel of the net to retain the part 16 always in an arched condition slanting forwardly from the mouth of the net whether upwardly or downwardly therefrom. When part 16 is below the mouth of the net it is known as a "belly piece," and when it is above the mouth of the net, it is known as a "back piece."

It will be understood that this invention is susceptible to modification in order to adapt it to different usages and conditions, and, accordingly, it is desired to comprehend such modifications within this invention as may fall within the scope of the appended claims.

I claim:

1. In a trawl-net, a truncated pyramidal central portion of rectangular cross section having side walls provided with ropes adapted to take up and distribute the forces exerted on the net and extending forwardly and outwardly therefrom, net portions connected between said ropes so as to define outwardly diverging wings, a forwardly slanting net portion having its lower longitudinal side edges connected to the adjacent longitudinal edges of said wings, and thus forming a continuous net member with said wings, a back rope extending along the foremost edge of said slanting net portion, said last mentioned net portion and said wings merging with and connected to the entrance to said pyramidal central portion along lines located in a plane coinciding substantially with the plane passing through the front ends of said side walls so that a rectangular mouth is formed at the entrance to said central portion, substantially vertical ropes located in said plane and extending transverse to the longitudinal upper and lower edges of said sidewalls for connecting the adjacent upper and lower edges of said central portion, at least one middling interconnecting one end of one of said substantially vertical ropes with the end of another substantially vertical rope at said entrance, means spaced from and arranged forwardly of said back rope operable to bias said back rope in a direction normal to the direction of movement of the net, and lines connecting said means with said slanting net portion and said middling.

2. In a trawl-net according to claim 1, a second middling spaced from and extending parallel to said first mentioned middling and located in the same vertical plane as the latter and connecting the other ends of said vertical ropes, and additional lines leading from two spaced points of said second middling intermediate the ends of said second middling, each said line being connected with a point on the adjacent of said wings, said points respectively being located in vertical alignment with the points of connection of said back rope with said wings.

3. In a trawl-net according to claim 1, a pair of sticks respectively arranged in planes coinciding with the planes of said diverging ropes and spaced from the outer ends of said wings, and lines connecting one end of each stick with oppositely located points on said means.

4. In a trawl-net, a truncated pyramidal central portion of substantially rectangular cross section having a top and bottom wall and having side walls provided with ropes adapted to take up and distribute the forces exerted on the net and extending forwardly and outwardly therefrom, net portions connected between said ropes to form outwardly diverging wings, a forwardly and upwardly slanting backpiece formed of net, said backpiece and said wings respectively merging with said top wall and said side walls along lines located in a plane coinciding substantially with the plane passing through the front ends of said top and bottom walls so that a rectangular mouth is formed at the entrance to said central portion, substantially vertical ropes located in said plane and extending transverse to the longitudinal upper and lower edges of said side walls for interconnecting the adjacent upper and lower edges, a back rope provided at the outer end of said backpiece and having its ends connected to said wings, a shearing board, and lines connecting said shearing board with the forward end of said top wall and extending transverse to the said back rope.

5. In a trawl-net, a truncated pyramidal central portion of substantialy rectangular cross section having a top and bottom wall and having side walls provided with ropes adapted to take up and distribute the forces exerted on the net and extending forwardly and outwardly from the front end of the central portion, net portions connected between the ropes to form outwardly diverging wings, a forwardly and downwardly slanting belly piece, said belly piece and said wings respectively merging with said bottom wall and said side walls, substantially vertically ropes located in a plane coinciding with the forward end portion of said central portion and extending transverse to the longitudinal upper and lower edges of said side walls for interconnecting the adjacent upper and lower edges, a back rope provided at the outer end of said belly piece and having its ends connected to said wings, means connected to said back rope at the forward edge of said belly piece operable to bias said back rope in a direction normal to the direction of travel of the net, and lines connecting said back rope with the forward end of said top wall and extending transverse to said back rope.

6. In a trawl-net, a truncated pyramidal central portion of substantially rectangular cross section having a top and bottom wall and having side walls provided with ropes adapted to take up and distribute the forces exerted on the net and extending forwardly and outwardly from the front end of the said central portion, net portions connected between the ropes to form outwardly diverging wings, a forwardly and upwardly slanting backpiece, said backpiece and said wings respectively merging with said top wall and said side walls along lines located in a plane coinciding substantially with the plane passing through the front ends of said top and bottom walls so that a rectangular mouth is formed at the entrance to said central portion, substantially vertical ropes located in said plane and extending transverse to the longitudinal upper and lower edges of said side walls for interconnecting the adjacent upper and lower edges, a back rope provided at the outer end of said backpiece and having its ends connected to said wings, a shearing board, lines connecting said shearing board with the forward end of said top wall and extending transverse to the said back rope, a middling located in said plane and interconnecting the upper edges of said side walls, first additional lines connecting the middle part of said back rope with said middling, and second additional lines connecting said middle part of said back rope with points on said wings located in front of said back rope.

CASPER JOSEPHUS BOTTEMANNE.

REFERENCES CITED

The following references are of record in the file of this patent:

FOREIGN PATENTS

| Number | Country | Date |
|---|---|---|
| 10,262 | Great Britain | A. D. 1911 |
| 11,643 | Great Britain | A. D. 1890 |
| 410,473 | Great Britain | May 15, 1933 |
| 666,814 | France | Oct. 7, 1929 |